US010703442B2

(12) United States Patent
Emura et al.

(10) Patent No.: US 10,703,442 B2
(45) Date of Patent: Jul. 7, 2020

(54) BICYCLE REAR DERAILLEUR

(71) Applicant: Shimano Inc., Osaka (JP)

(72) Inventors: Atsuhiro Emura, Osaka (JP); Shouta Suyama, Osaka (JP)

(73) Assignee: Shimano Inc., Osaka (JP)

( * ) Notice: Subject to any disclaimer, the term of this patent is extended or adjusted under 35 U.S.C. 154(b) by 126 days.

(21) Appl. No.: 15/650,672

(22) Filed: Jul. 14, 2017

(65) Prior Publication Data

US 2019/0016412 A1 Jan. 17, 2019

(51) Int. Cl.

*B62M 9/126* (2010.01)
*B62M 9/1242* (2010.01)
*B62M 9/124* (2010.01)
*B62M 9/1248* (2010.01)
*B62M 25/02* (2006.01)

(52) U.S. Cl.

CPC .......... *B62M 9/126* (2013.01); *B62M 9/1242* (2013.01); *B62M 9/1248* (2013.01); *B62M 25/02* (2013.01); *B62M 2009/12406* (2013.01)

(58) Field of Classification Search

CPC .. B62M 9/126; B62M 9/1242; B62M 9/1248; B62M 2009/12406
See application file for complete search history.

(56) References Cited

U.S. PATENT DOCUMENTS 4,061,048 A * 12/1977 Huret .................. B62M 9/1242 474/82
4,610,644 A * 9/1986 Nagano .................. B62M 9/126 474/82
4,840,605 A * 6/1989 Testa ...................... B62M 9/124 474/80
5,020,819 A * 6/1991 D'Aluisio ............. B62K 19/30 280/288
5,597,366 A * 1/1997 Ozaki .................. B62M 9/1244 474/82
5,624,335 A * 4/1997 Ando .................. B62M 9/1242 474/80
7,780,558 B2 * 8/2010 Kunisawa ............. B62M 9/128 474/78
9,090,311 B2 * 7/2015 Scolari ..................... B62M 9/04
9,545,971 B2 * 1/2017 Beutner ................... B62K 3/02
2004/0106482 A1 * 6/2004 Nagano ................ B62M 9/1242 474/82
2008/0026890 A1 * 1/2008 Oseto .................. B62M 9/1242 474/82
2013/0090196 A1 * 4/2013 Yamaguchi ............ B62M 9/122 474/80
2014/0213397 A1 * 7/2014 Yamaguchi ............ B62M 9/122 474/80

(Continued)

FOREIGN PATENT DOCUMENTS

DE 202016001048 U1 3/2016

*Primary Examiner* — Katherine W Mitchell
*Assistant Examiner* — Shiref M Mekhaeil
(74) *Attorney, Agent, or Firm* — Global IP Counselors, LLP

(57) ABSTRACT

A bicycle rear derailleur is basically provided with a chain guide and an indicator. The chain guide includes a guide pulley. The indicator is provided on the chain guide such that the indicator disposed on or in an outer periphery of the chain guide. The indicator is indicative of a setting position of an outer circumference of a sprocket of a bicycle rear sprocket assembly relative to the guide pulley.

18 Claims, 12 Drawing Sheets

5 30' 14 C2 S2 C1 S1 12 132 5 28 RA C3 148 130 148A 50 44A 44

(56) References Cited

U.S. PATENT DOCUMENTS

2015/0072817 A1* 3/2015 Yamaguchi ........... F16H 7/1227
474/113
2015/0115568 A1* 4/2015 Emura ................... B62M 9/135
280/261
2016/0046352 A1* 2/2016 Shipman ................ B62M 9/126
474/80
2016/0304161 A1* 10/2016 Shirai ...................... B62M 9/16
2017/0001685 A1* 1/2017 Kuwayama .......... B62M 9/1342
2018/0274623 A1* 9/2018 Brown ................... B62M 9/128
2018/0281899 A1* 10/2018 Bernardele ............ B62M 9/122
2018/0345723 A1* 12/2018 Fujita .................. B60B 27/0026
2019/0016412 A1* 1/2019 Emura ................... B62M 9/126
2019/0047324 A1* 2/2019 Fujita ...................... B60B 27/04
2019/0063585 A1* 2/2019 Fujita .................... B60B 27/023
2019/0127022 A1* 5/2019 Komatsu .................. B62M 9/12
2019/0127023 A1* 5/2019 Fujimoto ............... B62M 9/126

* cited by examiner

BICYCLE REAR DERAILLEUR

BACKGROUND

Field of the Invention

This invention generally relates to a bicycle rear derailleur. More specifically, the present invention relates to a bicycle rear derailleur configured to aid in setting a mounting position of the bicycle rear derailleur relative to a bicycle rear sprocket assembly.

Background Information

Generally, a bicycle typically uses a bicycle drive train for transmitting a pedaling force to a rear wheel. The drive train of a bicycle often uses one or two derailleurs to selectively move a bicycle chain from one of a plurality of sprockets to another for changing speeds of the bicycle. A rear derailleur is used to shift the bicycle chain from a plurality of rear sprockets. The rear derailleur is mounted to the bicycle frame by a fixing bolt.

SUMMARY

Generally, the present disclosure is directed to various features of a bicycle rear derailleur. In one feature, a bicycle rear derailleur is provided with an indicator for establishing a desired derailleur mounting position.

In view of the state of the known technology and in accordance with a first aspect of the present disclosure, a bicycle rear derailleur is basically provided that comprises a chain guide and an indicator. The chain guide includes a guide pulley. The indicator is provided on the chain guide such that the indicator disposed on or in an outer periphery of the chain guide. The indicator is indicative of a setting position of an outer circumference of a sprocket of a bicycle rear sprocket assembly relative to the guide pulley.

With the rear derailleur according to the first aspect, a user can conveniently and appropriately install the rear derailleur to the bicycle without an additional setting tool.

In accordance with a second aspect of the present invention, the bicycle rear derailleur according to the first aspect is configured so that the indicator is indicative of a setting position of an outer circumference of a largest sprocket of a bicycle rear sprocket assembly relative to the guide pulley.

With the rear derailleur according to the second aspect, a user can conveniently and appropriately install the rear derailleur to the bicycle without an additional setting tool.

In accordance with a third aspect of the present invention, the bicycle rear derailleur according to the first or second aspects is configured so that the indicator includes an arc shape.

With the rear derailleur according to the third aspect, a user can easily find an appropriate setting of the rear derailleur.

In accordance with a fourth aspect of the present invention, the bicycle rear derailleur according to the third aspect is configured so that the arc shape of the indicator extends along an arc having a center of curvature adjacent or coincident with a rotational center axis of the guide pulley.

With the rear derailleur according to the fourth aspect, a user can easily find an appropriate setting of the rear derailleur.

In accordance with a fifth aspect of the present invention, the bicycle rear derailleur according to any one of the first to fourth aspects is configured so that the indicator is printed indicium on the chain guide.

With the rear derailleur according to the fifth aspects, the manufacturing process of the rear derailleur with the indicium can be performed with ease.

In accordance with a sixth aspect of the present invention, the bicycle rear derailleur according to the fifth aspect is configured so that the printed indicium of the indicator is one of contact printed indicium and non-contact printed indicium.

With the rear derailleur according to the sixth aspect, the manufacturing process of the rear derailleur with the indicium can be performed with ease.

In accordance with a seventh aspect of the present invention, the bicycle rear derailleur according to any one of the first to fourth aspects is configured so that the indicator includes one of a blind bore and a through bore.

With the rear derailleur according to the seventh aspect, the rear derailleur having the indicium can be produced while achieving weight reduction.

In accordance with an eighth aspect of the present invention, the bicycle rear derailleur according to any one of the first to fourth aspects is configured so that the indicator includes a protuberance.

With the rear derailleur according to the eighth aspect a user can conveniently and appropriately install the rear derailleur to the bicycle without an additional setting tool.

In accordance with a ninth aspect of the present invention, the bicycle rear derailleur according to the eighth aspect is configured so that the protuberance is integrally formed with the chain guide as a unitary one-piece member.

With the rear derailleur according to the ninth aspect, the rear derailleur having the indicium can be produced while achieving weight reduction.

In accordance with a tenth aspect of the present invention, the bicycle rear derailleur according to the eighth aspect is configured so that the protuberance is a separate member from the chain guide.

With the rear derailleur according to the tenth aspect, a total weight of the rear derailleur and/or a total cost of the rear derailleur will be reduced because the manufacturer can manufacture the protuberance from a separate material from the chain guide.

In accordance with an eleventh aspect of the present invention, the bicycle rear derailleur according to any one of the first to fourth aspects is configured so that the indicator is a bent part of the chain guide.

With the rear derailleur according to the eleventh aspect, the rear derailleur can be manufactured with an indicium without increasing the total weight of the rear derailleur.

In accordance with a twelfth aspect of the present invention, the bicycle rear derailleur according to any one of the first to fourth aspects is configured so that the indicator is a part of a contour of the chain guide.

With the rear derailleur according to the twelfth aspect, the rear derailleur can be manufactured with an indicium without increasing the total weight of the rear derailleur.

In accordance with a thirteenth aspect of the present invention, the bicycle rear derailleur according to any one of the first to fourth aspects is configured so that the indicator is engraved in the chain guide.

With the rear derailleur according to the thirteenth aspect, the rear derailleur can be manufactured with an indicium without increasing the total weight of the rear derailleur.

In accordance with a fourteenth aspect of the present invention, the bicycle rear derailleur according to any one of the first to thirteenth aspects is configured so that the indicator is spaced from an outer circumference of the guide pulley by a radial distance ranging from three millimeters to thirty millimeters with respect to a rotational center axis of the guide pulley.

With the rear derailleur according to the fourteenth aspect, the user can install the rear derailleur at the appropriate distance from the bicycle frame.

In accordance with a fifteenth aspect of the present invention, the bicycle rear derailleur according to the fourteenth aspect is configured so that the radial distance ranges from ten millimeters to thirty millimeters.

With the rear derailleur according to the fifteenth aspect, the user can install the rear derailleur at the appropriate distance from the bicycle frame.

In accordance with a sixteenth aspect of the present invention, the bicycle rear derailleur according to the fifteenth aspect is configured so that the radial distance ranges from fifteen millimeters to twenty-five millimeters.

With the rear derailleur according to the sixteenth aspect, the user can install the rear derailleur at the appropriate distance from the bicycle frame.

In accordance with a seventeenth aspect of the present invention, the bicycle rear derailleur according to any one of the first to sixteenth aspects is configured so that the chain guide includes at least one guide plate, and the indicator is disposed on the at least one guide plate.

With the rear derailleur according to the seventeenth aspect, a user can conveniently and appropriately install the rear derailleur to the bicycle without an additional setting tool.

In accordance with an eighteenth aspect of the present invention, the bicycle rear derailleur according to the seventeenth aspect is configured so that the at least one guide plate includes a first guide plate and a second guide plate, and the indicator is disposed on one of the first guide plate and the second guide plate.

With the rear derailleur according to the eighteenth aspect, a user can conveniently and appropriately install the rear derailleur to the bicycle without an additional setting tool.

In accordance with a nineteenth aspect of the present invention, the bicycle rear derailleur according to the eighteenth aspect is configured so that the indicator is disposed on the first guide plate. The second guide plate is disposed closer to a vertical center plane of a bicycle than the first guide plate in a state where the bicycle rear derailleur is mounted to the bicycle.

With the rear derailleur according to the nineteenth aspect, a user can conveniently and appropriately install the rear derailleur to the bicycle without an additional setting tool.

In accordance with a twentieth aspect of the present invention, the bicycle rear derailleur according to the nineteenth aspect is configured so that the first guide plate includes a first surface and a second surface. The first surface faces towards the vertical center plane of the bicycle in the state where the bicycle rear derailleur is mounted to the bicycle. The second surface faces in an opposite direction from the first surface, and the indicator is disposed on the first surface.

With the rear derailleur according to the twentieth aspect, a user can conveniently and appropriately install the rear derailleur to the bicycle without an additional setting tool.

Also other objects, features, aspects and advantages of the disclosed bicycle rear derailleur will become apparent to those skilled in the art from the following detailed description, which, taken in conjunction with the annexed drawings, discloses several embodiments of the bicycle rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
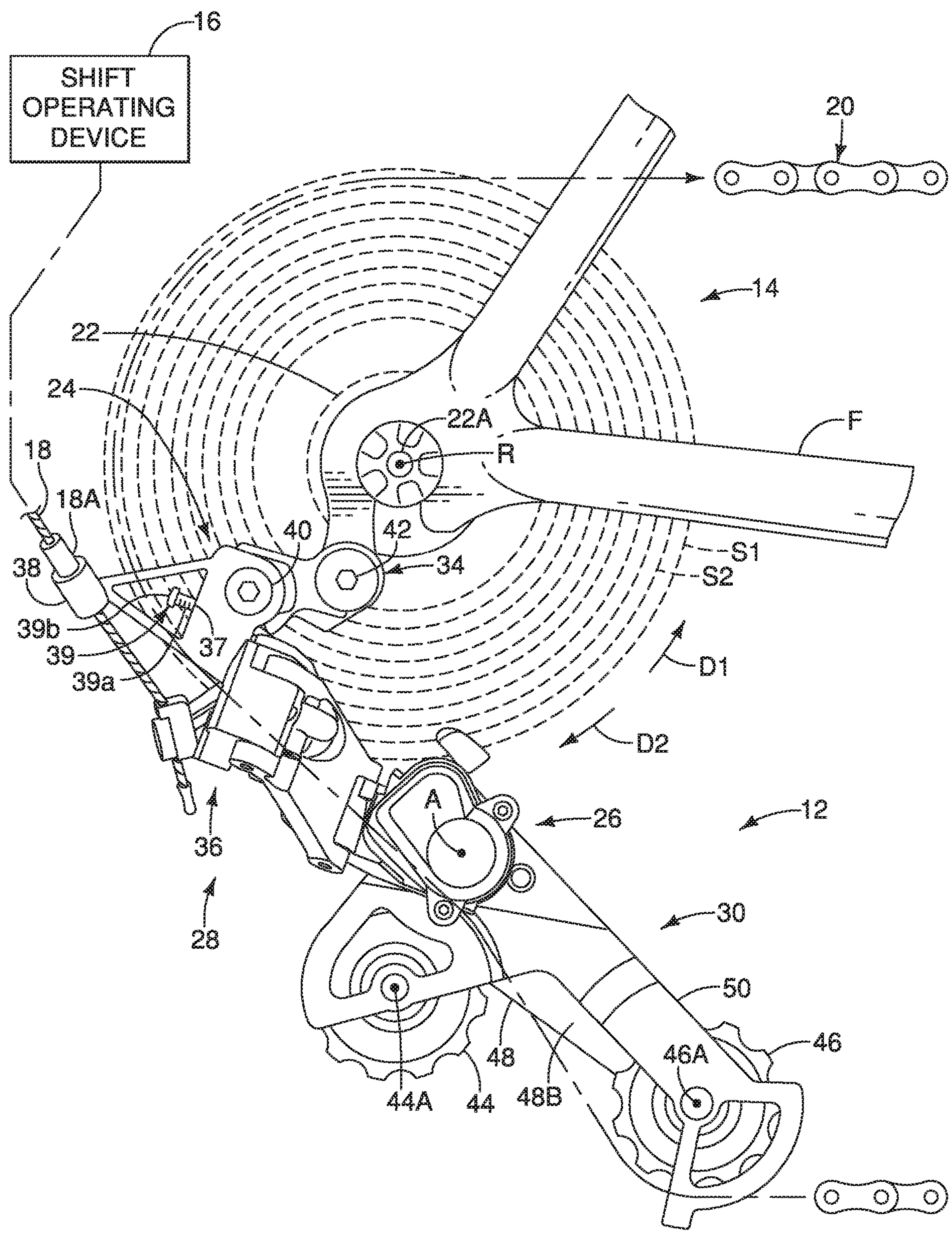
FIG. 1 is an outside elevational view of a rear portion of a bicycle frame equipped with a rear sprocket assembly and a bicycle rear derailleur in accordance with one illustrated embodiment.

Referring initially to FIG. 1, a rear portion of a bicycle frame F is equipped with a bicycle rear derailleur 12 in accordance with one illustrated embodiment. The bicycle frame F rotatably supports a rear wheel (not shown) and the bicycle wheel includes a plurality of rear sprockets 14. The rear derailleur 12 is operatively coupled to a bicycle operating device 16 via a control cable 18 in a conventional manner. The rear derailleur 12 is configured to shift a bicycle chain 20 between the rear sprockets 14, as will be further discussed below. The rear sprockets 14 are mounted on a freewheel (not shown) of a rear hub 22 in a conventional manner to transmit drive torque to the rear wheel (not shown). The rear sprockets 14 are arranged coaxial with a sprocket axis R of a rear hub axle 22A. The rear sprockets 14 are part of a conventional rear sprocket assembly, and thus, the rear sprockets 14 will not be further discussed in detail herein.

The bicycle rear derailleur 12 comprises a base member 24, a movable member 26 and a linkage assembly 28. The bicycle rear derailleur 12 further comprises a chain guide 30. The movable member 26, the linkage assembly 28 and the chain guide 30 are configured to move relative to the base member 24 to shift the bicycle chain 20 between the rear sprockets 14. In particular, the chain guide 30 is configured to pivot about a chain guide pivot axis A. The bicycle rear derailleur 12 further comprises an indicator 32. As shown, the indicator 32 is provided on the chain guide 30 such that the indicator 32 is disposed on or in an outer periphery 30' of the chain guide 30. In other words, the indicator 32 is disposed on or in an outer circumferential edge of the chain guide 30. In the illustrated embodiment, the indicator 32 is provided on the chain guide 30 to indicate a desired setting position for the rear derailleur 12, as will be further discussed below.

Also, in the illustrated embodiment, the rear derailleur 12 is a single tension type rear derailleur. That is, the chain guide 30 is the only tension applying member of the rear derailleur 12 that applies tension to the bicycle chain 20 during use. However, it will be apparent to those skilled in the bicycle field from this disclosure that the rear derailleur 12 can be configured as a double tension type derailleur. It will also be apparent to those skilled in the bicycle field from this disclosure that the indicator 32 can be provided on different types of mechanical or electric rear derailleurs having a variety of different configurations.

The base member 24 will now be discussed. The base member 24 is configured to be mounted to the bicycle frame F. In particular, the base member 24 is configured to be detachably mounted to the bicycle frame F. The base member 24 is a rigid member made of a suitable material such as a metallic material or a fiber reinforced plastic material. Basically, the base member 24 includes a bracket axle unit 34, a main body portion 36 and an outer casing support portion 38. The main body portion 36 is configured and arranged to be pivotally mounted to the bracket axle unit 34 for limited pivotal movement relative thereto. The outer casing support portion 38 supports one end of the outer casing 18A of the control cable 18. The main body portion 36 includes an adjust bolt receiving portion 37. The adjust bolt receiving portion 37 receives an adjust bolt 39. The adjust bolt 39 includes a male threaded portion 39*a* and a tool engagement portion 39*b*. The adjust bolt receiving portion 37 includes a female thread (not shown) engaged with the male threaded portion 39*a* of the adjust bolt 39. The bracket axle unit 34 is a stationary (non-movable) member relative to the bicycle frame F. The bracket axle unit 34 pivotally supports the main body portion 36 and the outer casing support portion 38 via a first mounting bolt 40. The bracket axle unit 34 is fixed to a hanger portion of the bicycle frame F via a second mounting bolt 42.

As will be further discussed below, a user can adjust a relative angle and/or a relative position of the rear derailleur 12 with respect to the rear sprockets 14. Also, as will be further discussed below, a user can utilize the indicator 32 during the adjustment of the relative angle and/or the relative position of the rear derailleur 12 with respect to the rear sprockets 14 to achieve an appropriate rear derailleur position when mounted to the bicycle frame F.

It will be apparent to those skilled in the bicycle field from this disclosure that the adjustment mechanism of the rear derailleur 12 with respect to the bicycle frame F can also alter depending on the mounting structure and/or bracket type. It will be apparent to those skilled in the bicycle field from this disclosure that the indicator 32 can be disposed on a rear derailleur having a variety of different frame mounting structures, and can be used to indicate an appropriate position and/or an appropriate angle of the rear derailleur relative to the rear sprockets 14.

As best seen in FIG. 1, the linkage assembly 28 is pivotally attached to the base member 24 and is pivotally attached to the movable member 26. The linkage assembly 28 is also pivotally attached to the base member 24 and is pivotally attached to the movable member 26. Thus, the base member 24, the movable member 26, and the linkage assembly 28 form a four-bar linkage arranged to move the chain guide 30 laterally between a plurality of shift positions (e.g., a top shift stage position and a low shift stage position) in a conventional manner.

The linkage assembly 28 further includes a biasing member (not shown) to bias the movable member 26 towards one of the top shift stage position and the low shift stage position. Typically, the biasing member is a coil tension spring that biases the movable member 26 towards the top shift stage position. As used herein, the term “top shift stage (gear) position” refers to the rear derailleur 12 being in an operating position that corresponds to the chain 20 being guided onto the one of the rear sprockets 14 with the smallest number of teeth (i.e., the smallest sprocket). As used herein, the term “low shift stage (gear) position” refers to the rear derailleur 12 being in an operating position that corresponds to the chain 20 being guided onto the one of the rear sprockets 14 with the largest number of teeth (i.e., the largest sprocket S1). The rear derailleur 12 is illustrated as being in the low shift stage position.

The movable member 26 movably connects the linkage assembly 28 and the chain guide 30 so that the chain guide 30 can pivot about the chain guide pivot axis A. The movable member 26 is a rigid member made of a suitable material such as a metallic material or a fiber reinforced plastic material. The movable member 26 functions in a conventional manner and will not be further discussed herein.

The chain guide 30 is pivotally mounted to the movable member 26 about the chain guide pivot axis A. In this way, the chain guide 30 pivots relative to the movable member 26. The chain guide 30 cooperates with the movable member 26 to create tension in the bicycle chain 20 as the rear derailleur 12 moves parallel to the sprocket axis R during a shifting operation. The chain guide 30 further includes a guide pulley 44. The chain guide 30 further includes a tension pulley 46. The guide pulley 44 is positioned closer to the rear sprockets 14 than the tension pulley 46 in a state where the rear derailleur 12 is mounted to the bicycle frame F. The guide pulley 44 has a first rotational axis 44A. The tension pulley 46 has a second rotational axis 46A. The chain guide pivot axis A is substantially parallel to the first and second rotational axes 44A and 46A. Also, as best seen in FIG. 1, the chain guide pivot axis A is offset from the first rotational axis 44A. The chain guide 30 is pivotally mounted to the movable member 26 about the chain guide pivot axis A in a conventional manner with a torsion spring (not shown) interposed therebetween.

Figure 2:
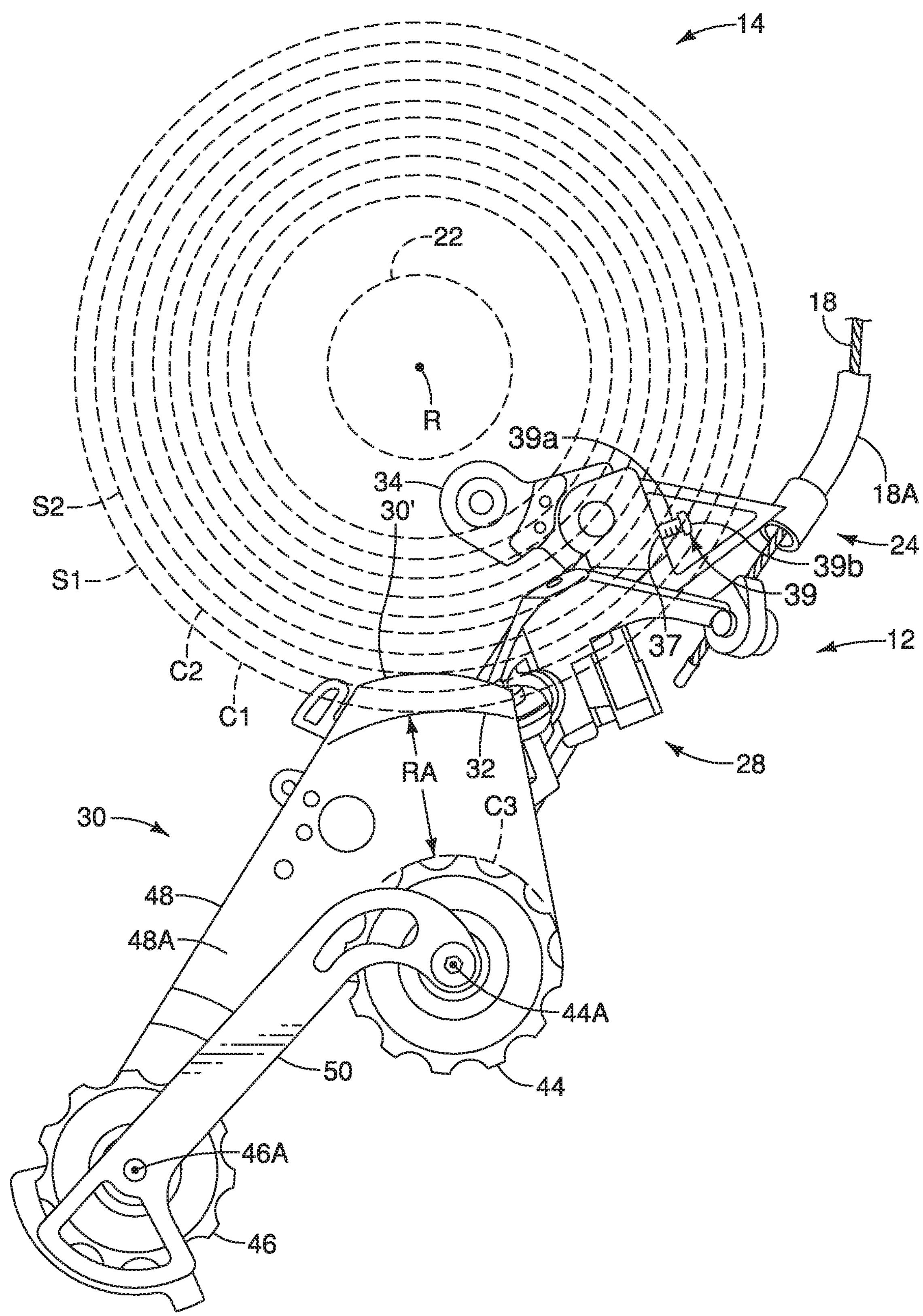
FIG. 2 is a frame facing side elevational view of the bicycle rear derailleur illustrated in FIG. 1 to show an indicator with respect to the rear sprocket assembly, which is diagrammatically shown in dashed lines.
Figure 3:
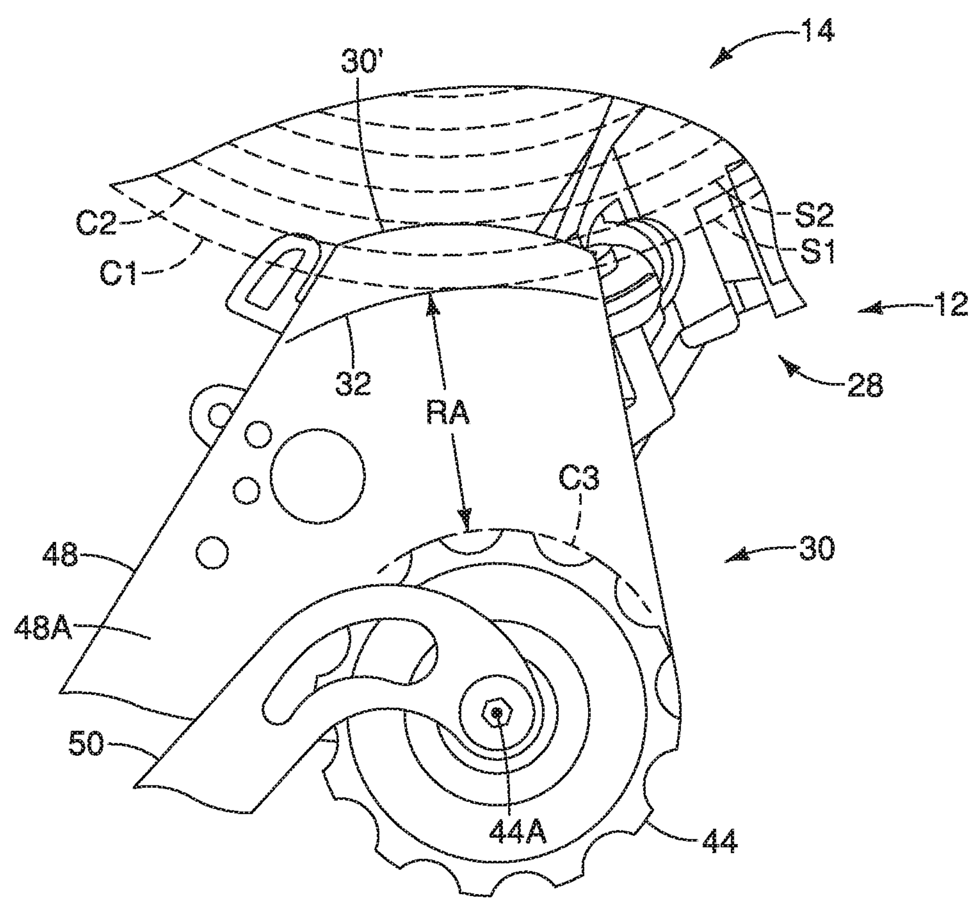
FIG. 3 is an enlarged side elevational view of a portion of a chain guide of the bicycle rear derailleur illustrated in FIGS. 1 and 2 showing the indicator on a frame facing side of a chain guide.

The chain guide 30 includes a first guide plate 48 and a second guide plate 50. Thus, the chain guide 30 includes at least one guide plate. In the illustrated embodiment, the at least one guide plate includes the first guide plate 48 and the second guide plate 50. As will be further discussed below, the indicator 32 is disposed on the at least one guide plate. In particular, the guide pulley 44 and the tension pulley 46 are both rotatably disposed between the first and second guide plates 48 and 50. In the illustrated embodiment, as seen in FIGS. 2 and 3, the second guide plate 50 is disposed closer to a vertical center plane VP of the bicycle than the first guide plate 48 in a state where the bicycle rear derailleur 12 is mounted to the bicycle frame F. In other words, the second guide plate 50 is an "inner plate" while the first guide plate 48 is an "outer plate" of the chain guide 30. As shown, the first guide plate 48 includes a first surface 48A and a second surface 48B. The first surface 48A faces towards the vertical center plane VP of the bicycle in the state where the bicycle rear derailleur 12 is mounted to the bicycle. The second surface 48B faces in an opposite direction from the first surface 48A, the indicator 32 is disposed on the first surface 48A. In other words, the first surface 48A is an "inside surface" of the first guide plate 48 while the second surface 48B is an "outside surface" of the first guide plate 48. The first and second guide plates 48 and 50 define a chain receiving slot for receiving the bicycle chain 20.

The indicator 32 is disposed on one of the first guide plate 48 and the second guide plate 50. Preferably, the indicator 32 is disposed on the first guide plate 48. The indicator 32 is indicative of a setting position of an outer circumference of a sprocket of the bicycle rear sprocket assembly 14 relative to the guide pulley 44. In particular, the indicator 32 is indicative of a setting position of an outer circumference C1 of a largest sprocket S1 relative to the guide pulley 44. While the illustrated embodiment shows the indicator 32 as being indicative of the largest sprocket S1, it will be apparent to those skilled in the bicycle field that the rear derailleur 12 could alternatively, or in addition, have an indicator 32 that is indicative of the second-largest sprocket S2.

In the illustrated embodiment, the indicator 32 is spaced from the outer circumference C3 of the guide pulley 44 by a radial distance RA ranging from three millimeters to thirty millimeters with respect to a rotational center axis 44A of the guide pulley 44. Preferably, the radial distance RA ranges from ten millimeters to thirty millimeters. More preferably, the radial distance RA ranges from fifteen millimeters to twenty-five millimeters.

As will be further explained below, preferably, the indicator 32 is permanently fixed on the chain guide 30. For example, the indicator 32 can be a substantially permanent mark, engraving, an indentation or an opening on the chain guide 30. The indicator 32 can alternatively be a protrusion, a flange or a raised portion of the chain guide 30. Also, the first guide plate 48 of the chain guide 30 can be shaped such that the outer periphery 30' of the first guide plate 48 is the indicator 32 that indicates an outer circumference C1 of the largest sprocket S1. In other words, the chain guide 30 itself can also serve as the indicator 32. Alternatively, it will be apparent to those skilled in the bicycle field from this disclosure that the first guide plate 48 of the chain guide 30 can be shaped such that an outer periphery 30' of the first guide plate 48 is the indicator 32 that indicates an outer circumference C2 of the second-largest sprocket S2.

Referring now to FIGS. 2 to 3, the indicator 32 includes an arc shape. The arc shape of the indicator 32 extends along an arc having a center of curvature that is adjacent or coincident with the rotational center axis of the guide pulley 44. In other words, if the are of the indicator 32 is extended to create a phantom circle, the circle would have a center of curvature that is adjacent or coincident with the rotational center axis 44A of the guide pulley 44. In the illustrated embodiment, the center of curvature is coincident with the rotational center axis 44A of the guide pulley 44. In other words, the rotational center axis 44A of the guide pulley 44 marks the center of curvature of the indicator 32. However, it will be apparent to those skilled in the bicycle field from this disclosure that the center of curvature of the indicator 32 can be slightly offset or adjacent to the rotational center axis 44A of the guide pulley 44. As shown, the indicator 32 can be a continuously extending arc. Alternatively, it will be apparent to those skilled in the bicycle field from this disclosure that the indicator 32 can be two or more dashed arcs that substantially extend along an arc having a center of curvature that is adjacent or coincident with the rotational center axis 44A of the guide pulley 44.

In the illustrated embodiment, the indicator 32 is printed indicium on the chain guide 30. In other words, the indicator 32 can be an image that is imposed on the chain guide 30 via a printing procedure. Alternatively speaking, the indicator 32 is a printed medium. In particular, the printed indicium of the indicator 32 is one of contact printed indicium and non-contact printed indicium. Preferably, the printed indicium is non-contact printed indicium. Non-contact printing, for example, includes inkjet printing and laser printing. Contact printing, for example, can include pad printing and screen printing. Thus, the indicium can be a two-dimensional image that is transferred onto the chain guide 30 via a printing process. In particular, the indicium can be an embossed or a raised image that has been produced by a printing process.

An adjustment of the rear derailleur 12 with respect to the bicycle frame F while using the indicator 32 will now be discussed. When setting the rear derailleur 12 to the bicycle frame F, the user can shift the rear derailleur 12 to the largest sprocket S1 so that the chain guide 30 is in the low gear stage position as illustrated. The user can fine tune the rear derailleur 12 in the low position via adjustment of the adjust bolt 39 that changes the relative position and/or the relative angle of the rear derailleur 12 with respect to the bicycle frame F so that the indicator 32 tangentially contacts the outer circumference C2 of the largest sprocket S1, as seen in FIGS. 2 and 3. For example, the user can adjust the adjust bolt 39 so that the rear derailleur 12 can be turned with respect to a clockwise direction D1 or a counterclockwise direction D2 with respect to the sprocket axis R.

Figure 4:
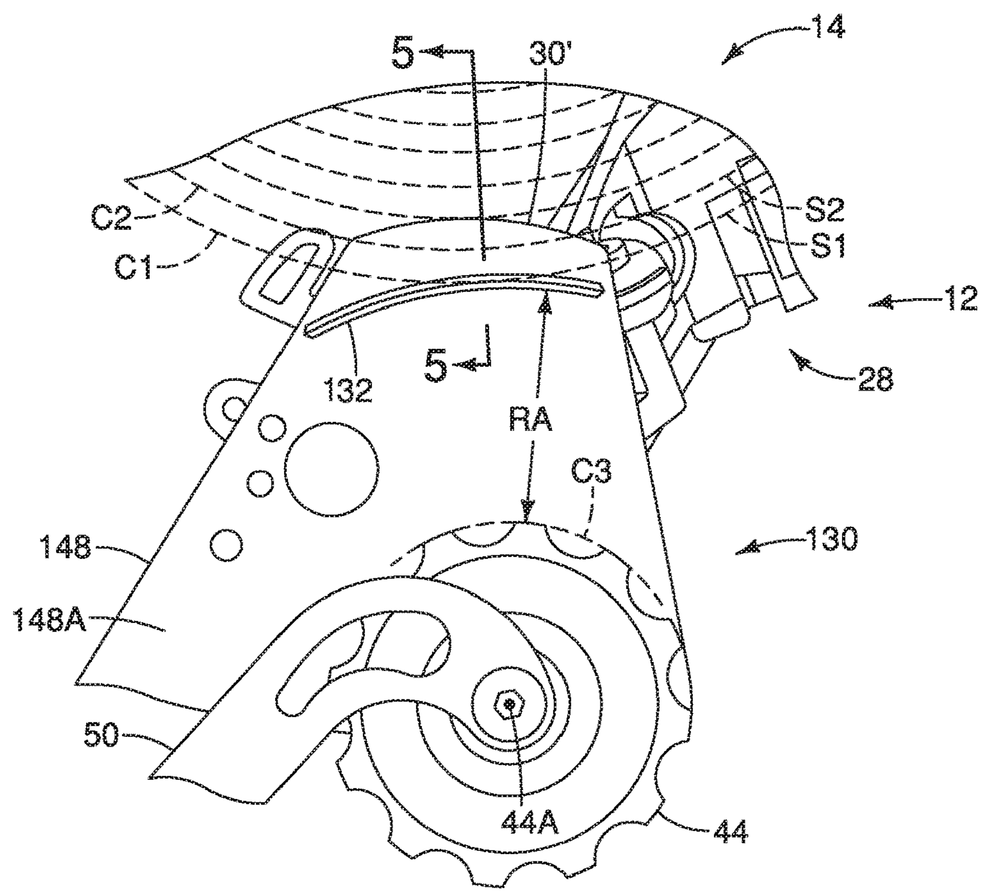
FIG. 4 is an enlarged side elevational view of a portion of a first modified chain guide provided with a first modified indicator.
Figure 5:
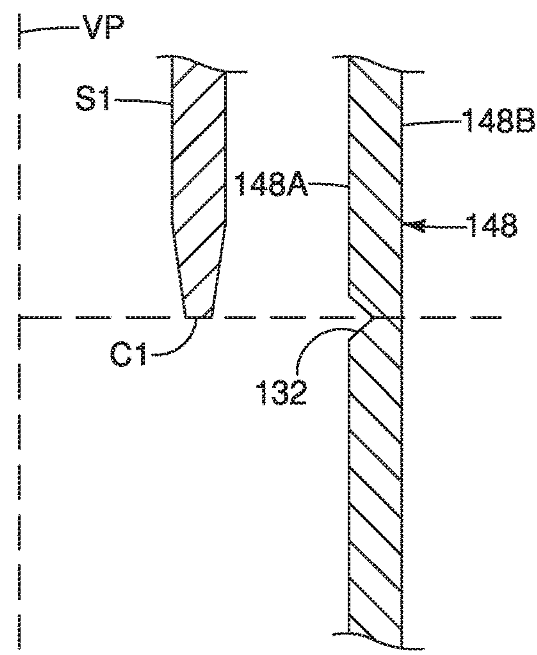
FIG. 5 is a partial cross sectional view of the first modified chain guide as seen along section line 5-5 of FIG. 4 with the largest sprocket also shown in partial cross section.

Referring now to FIGS. 4 and 5, a modified chain guide 130 is illustrated that is being used in place of the chain guide 30 with the rear derailleur 12. The rear derailleur 12 is otherwise identical to the rear derailleur 12 of FIGS. 1 to 3 except for the chain guide 30 has been replaced by the modified chain guide 130 having a modified first guide plate 148. The first guide plate 148 has a first surface 148A and a second surface 148B. The first surface 148A is disposed closer to the vertical center plane VP than the second surface 148B when the rear derailleur 12 is installed onto the bicycle frame F. The chain guide 130 is otherwise identical to the chain guide 30. The modified chain guide 130 has an indicator 132. The indicator 132 is engraved on the modified chain guide 130. Preferably, as shown, the indicator 132 is engraved on a first surface 148A of the first guide plate 148 of the chain guide 130. The indicator 132 can be engraved via a variety of conventional engraving methods, such as by an engraving tool like a pneumatic graver or by laser etching.

Figure 6:
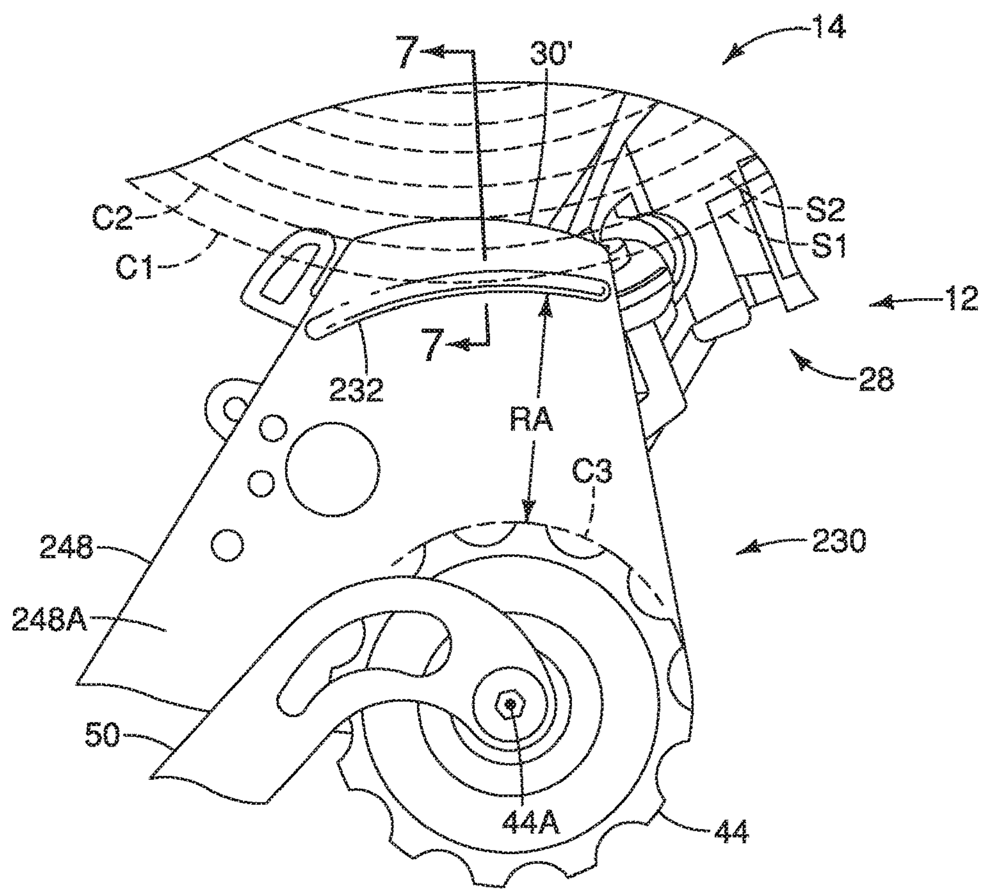
FIG. 6 is an enlarged side elevational view of a portion of a second modified chain guide provided with a second modified indicator.
Figure 7:
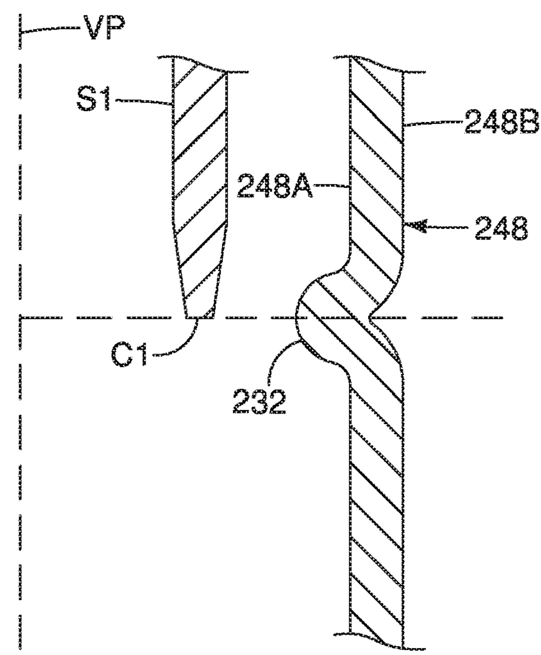
FIG. 7 is a partial cross sectional view of the second modified chain guide as seen along section line 7-7 of FIG. 6 with the largest sprocket also shown in partial cross section.

Referring now to FIGS. 6 and 7, a second modified chain guide 230 is illustrated that is being used in place of the chain guide 30 with the rear derailleur 12. The rear derailleur 12 is otherwise identical to the rear derailleur 12 of FIGS. 1 to 3 except for the chain guide 30 is replaced by the second modified chain guide 230 having a modified first guide plate 248. The first guide plate 248 has a first surface 248A and a second surface 248B. The first surface 248A is disposed closer to the vertical center plane VP than the second surface 248B when the rear derailleur 12 is installed onto the bicycle frame F. The chain guide 230 is otherwise identical to the chain guide 30. The second modified chain guide 230 includes an indicator 232. The indicator 232 includes a protuberance. Preferably, the protuberance is formed on the first surface 248A. In other words, the second modified indicator 232 includes a raised surface on the chain guide 230. As shown in FIG. 7, the protuberance is integrally formed with the chain guide 230 as a unitary one-piece member.

Figure 8:
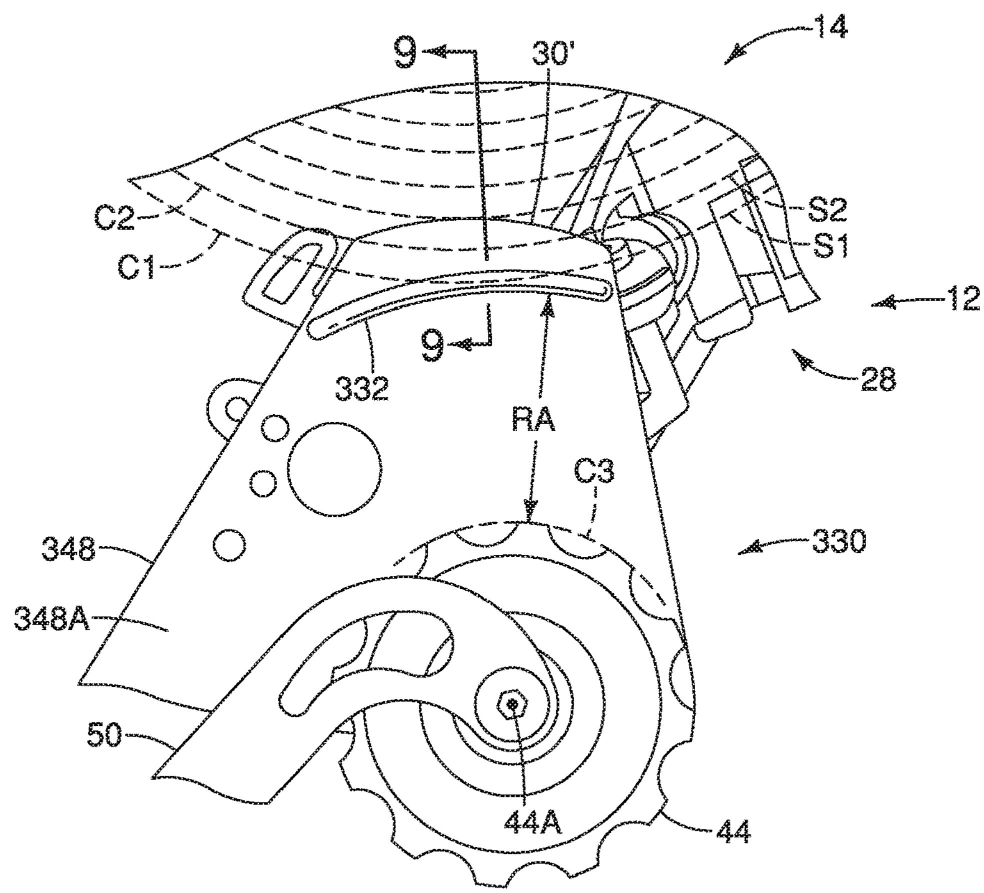
FIG. 8 is an enlarged side elevational view of a portion of a third modified chain guide provided with a third modified indicator.
Figure 9:
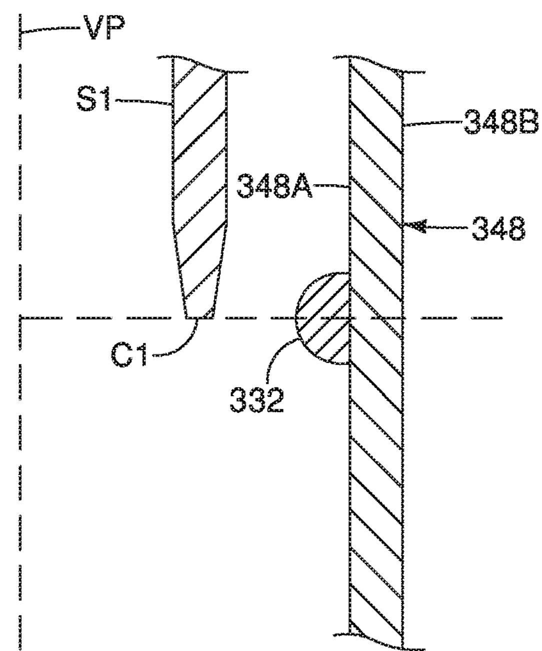
FIG. 9 is a partial cross sectional view of the third modified chain guide as seen along section line 9-9 of FIG. 8 with the largest sprocket also shown in partial cross section.

Referring now to FIGS. 8 and 9, a third modified chain guide 330 is illustrated that is being used in place of the chain guide 30 with the rear derailleur 12. The rear derailleur 12 is otherwise identical to the rear derailleur 12 of FIGS. 1 to 3 except for the chain guide 30 being replaced by the third modified chain guide 330 having a modified first guide plate 348. The first guide plate 348 has a first surface 348A and a second surface 348B. The first surface 348A is disposed closer to the vertical center plane VP than the second surface 348B when the rear derailleur 12 is installed onto the bicycle frame F. The chain guide 330 is otherwise identical to the chain guide 30. The third modified chain guide 330 has an indicator 332 that also includes a protuberance. Preferably, as shown, the protuberance is formed on the first surface 348A of the first guide plate 348. The protuberance is identical to the protuberance of FIGS. 6 and 7 except that the protuberance is a separate member from the chain guide 330. That is, the protuberance can be a separate member that is adhered to the chain guide 330 by an adhesive, by molding or other conventional method. For example, protuberance can be a rigid member that is made from metal, plastic or rubber that is subsequently adhered to the chain guide 330.

Figure 10:
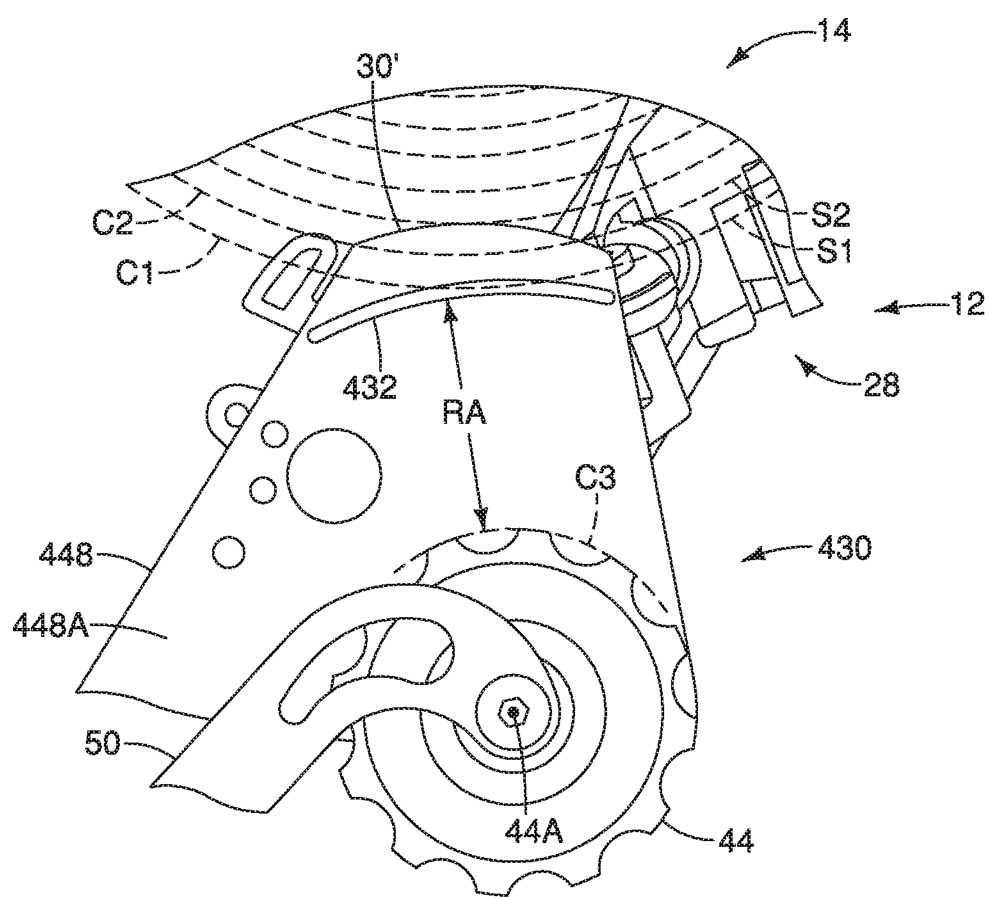
FIG. 10 is an enlarged side elevational view of a portion of a fourth modified chain guide provided with a fourth modified indicator.

Referring now to FIG. 10, a fourth modified chain guide 430 is illustrated that is being used in place of the chain guide 30 with the rear derailleur 12. The rear derailleur 12 is otherwise identical to the rear derailleur 12 of FIGS. 1 to 3 except for the chain guide 30 being replaced by the fourth modified chain guide 430 having a modified first guide plate 448. The first guide plate 448 includes a first surface 448A and a second opposite facing surface (not shown). The chain guide 430 is otherwise identical to the chain guide 30. The fourth modified chain guide 430 has an indicator 432 that is an opening on the first guide plate 448. In particular, the indicator 432 is an opening through the first surface 448A and the second opposite facing surface of the first guide plate 448. As shown, the opening includes an arc shape that extends along an arc having a center of curvature that is adjacent or coincident with the rotational center axis 44A of the guide pulley 44 of the fourth modified chain guide 430.

Figure 11:
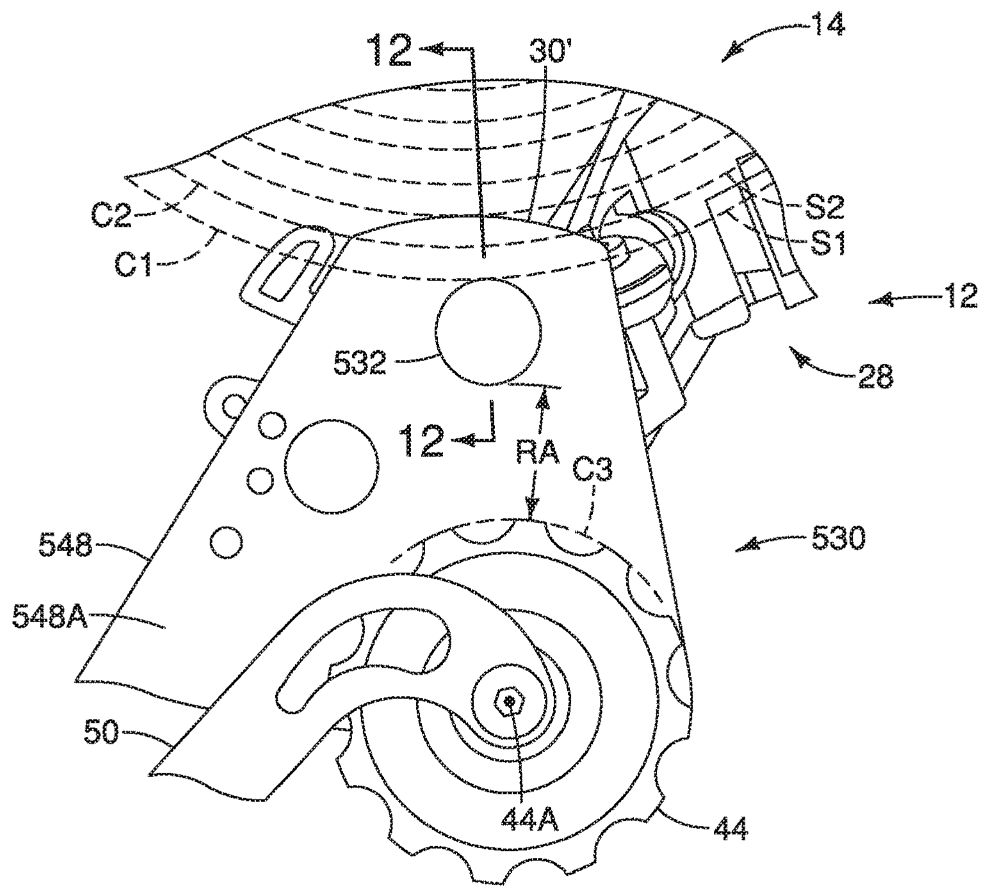
FIG. 11 is an enlarged side elevational view of a portion of a fifth modified chain guide provided with a fifth modified indicator.
Figure 12:
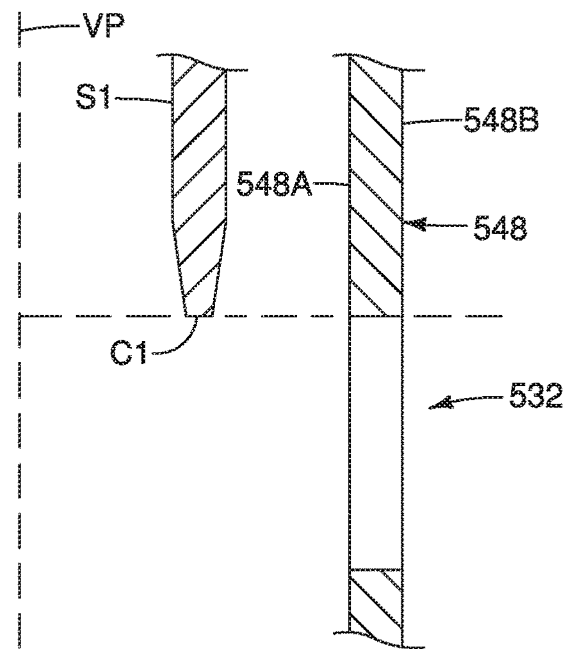
FIG. 12 is a partial cross sectional view of the fifth modified chain guide as seen along section line 12-12 of FIG. 11 with the largest sprocket also shown in partial cross section.

Referring now to FIGS. 11 and 12, a fifth modified chain guide 530 is illustrated that is being used in place of the chain guide 30 with the rear derailleur 12. The rear derailleur 12 is otherwise identical to the rear derailleur 12 of FIGS. 1 to 3 except for the chain guide 30 is replaced by the fifth modified chain guide 530 having a modified first guide plate 548. The first guide plate 548 has a first surface 548A and a second surface 548B. The first surface 548A is disposed closer to the vertical center plane VP than the second surface 548B when the rear derailleur 12 is installed onto the bicycle frame F. The chain guide 530 is otherwise identical to the chain guide 30. The fifth modified chain guide 530 has an indicator 532 that is a through bore. In the indicator 532 of FIGS. 11 and 12, the indicator can be an opening on the first guide plate 548 of the fifth modified chain guide 530. For example, the indicator 532 can be a clearance hole that is reamed, drilled or milled through the first and second surfaces 548A and 548B of the first guide plate 548. An outer circumference of the through bore includes an arc shape that extends along an arc having a center of curvature adjacent or coincident with the rotational center axis 44A of the guide pulley 44 of the fifth modified chain guide 530.

Figure 13:
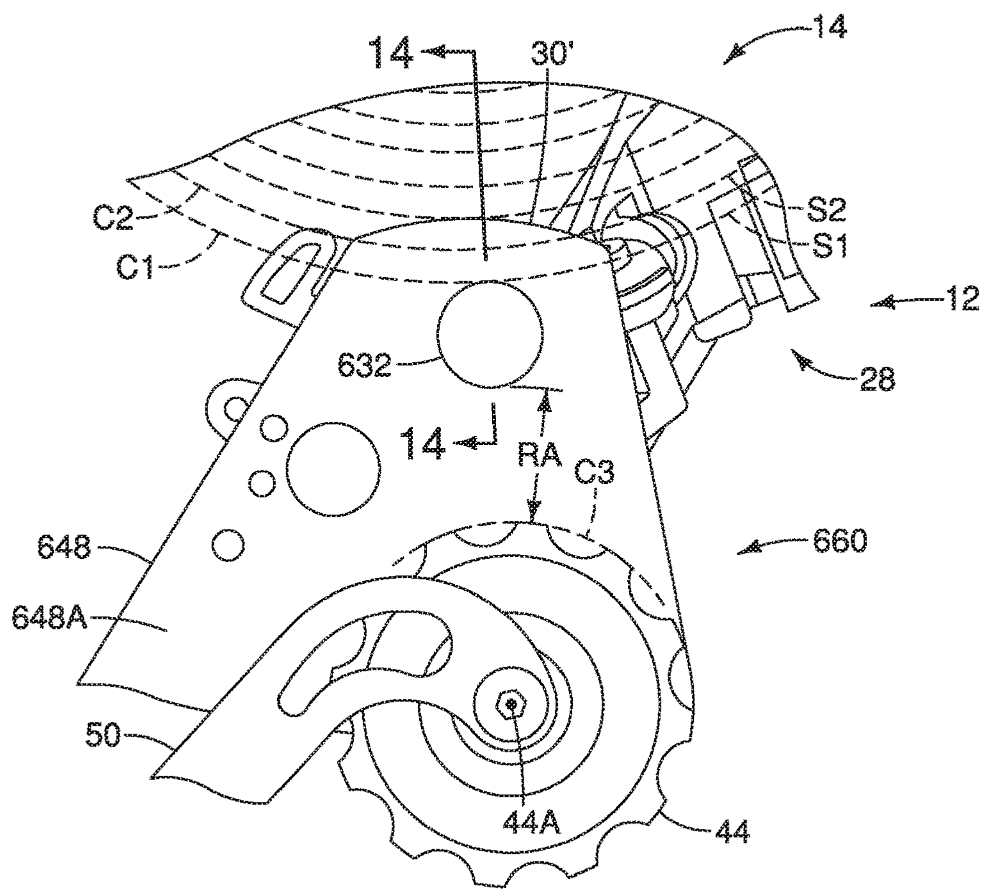
FIG. 13 is an enlarged side elevational view of a portion of a sixth modified chain guide provided with a sixth modified indicator.
Figure 14:
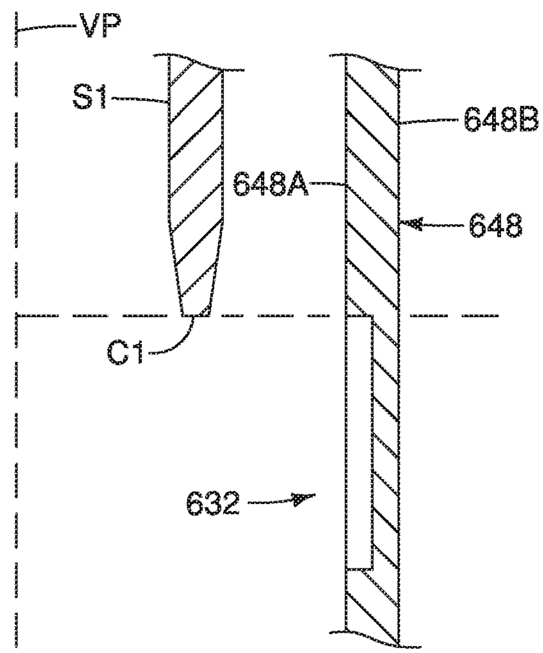
FIG. 14 is a partial cross sectional view of the sixth modified chain guide as seen along section line 14-14 of FIG. 13 with the largest sprocket also shown in partial cross section.

Referring now to FIGS. 13 and 14, a sixth modified chain guide 630 is illustrated that is being used in place of the chain guide 30 with the rear derailleur 12. The rear derailleur 12 is otherwise identical to the rear derailleur 12 of FIGS. 1 to 3 except for the chain guide 30 is replaced by the sixth modified chain guide 630 having a modified first guide plate 648. The first guide plate 648 includes a first surface 648A and a second surface 648B. The first surface 648A is disposed closer to the vertical center plane VP than the second surface 648B when the rear derailleur 12 is installed onto the bicycle frame F. The chain guide 630 is otherwise identical to the chain guide 30. The sixth modified chain guide 630 has an indicator 632 that is a blind bore. In other words, the indicator 632 of the sixth modified chain guide 630 is a hole that is reamed, drilled or milled to a specified depth on the first guide plate 648 without breaking to the other side of the first guide plate 648. It will be apparent to those skilled in the bicycle field from this disclosure that the blind bore can include a recess having a variety of shapes that include an arc having a center of curvature that is adjacent or coincident with the rotational center axis 44A of the guide pulley 44 of the sixth modified chain guide 630. It will also be apparent to those skilled in the bicycle field from this disclosure that the blind bore can also include a groove that includes an arc shape. Thus, the rear derailleur 12 can include an indicator that includes one of a blind bore (indicator 632) and a through bore (indicator 532).

Figure 15:
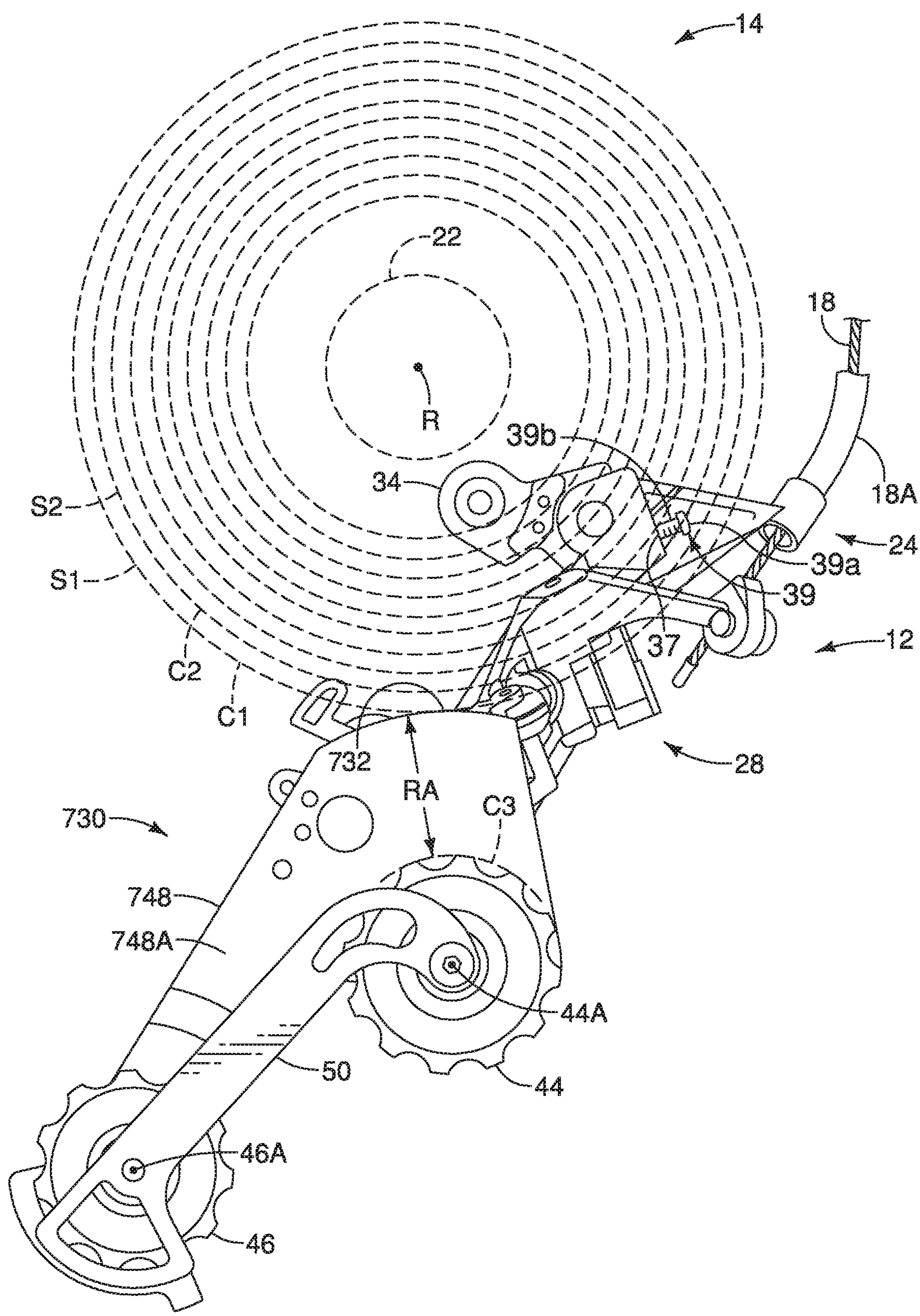
FIG. 15 is a frame facing side elevational view of the bicycle rear derailleur having a seventh modified indicator positioned with respect to the rear sprocket assembly, which is diagrammatically shown in dashed lines.
Figure 16:
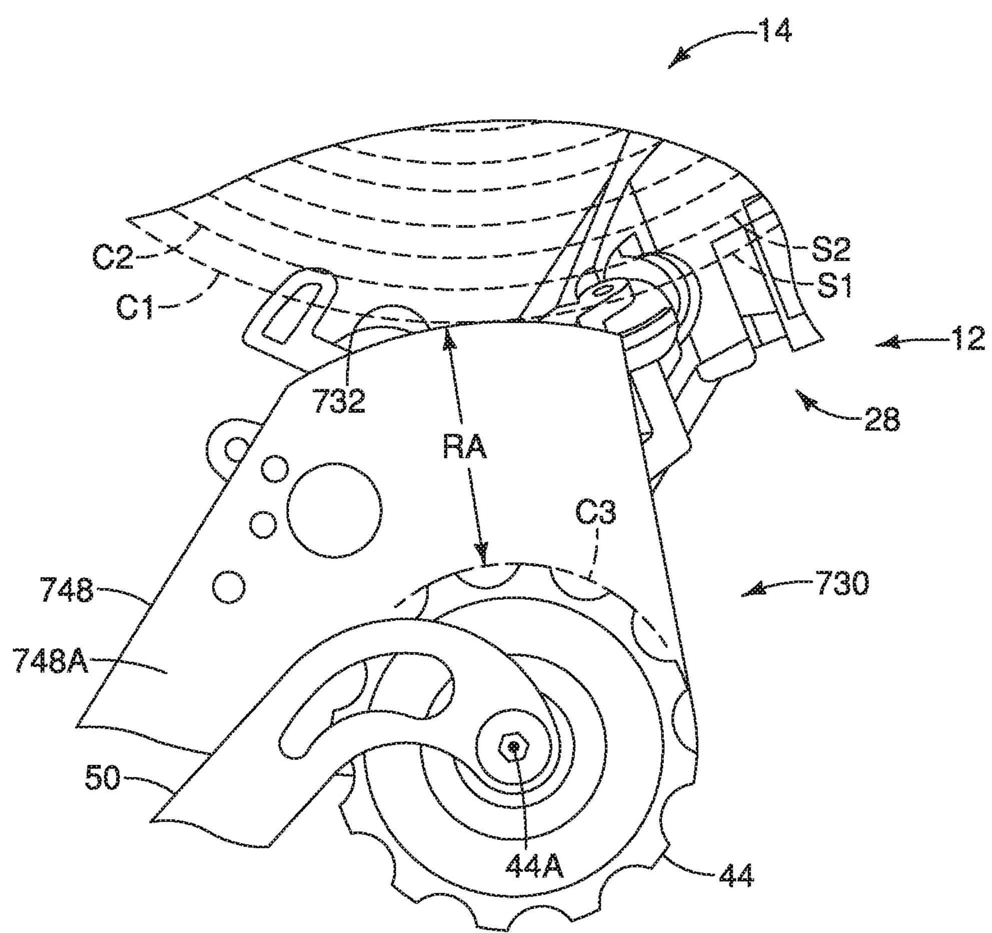
FIG. 16 is an enlarged side elevational view of a portion of a seventh modified chain guide provided with a seventh modified indicator.

Referring now to FIGS. 15 and 16, a seventh modified chain guide 730 is illustrated that is being used in place of the chain guide 30 with the rear derailleur 12. The rear derailleur 12 is otherwise identical to the rear derailleur 12 of FIGS. 1 to 3 except for the chain guide 30 is replaced by the seventh modified chain guide 730 having a modified first guide plate 748. The chain guide 730 is otherwise identical to the chain guide 30. The seventh modified chain guide 730 has an indicator 732 that is a part of a contour of the chain guide 730. In particular, the indicator 732 is part of an outer circumference of the first guide plate 748 of the seventh modified chain guide 730. As shown, the first guide plate 748 can be shaped to have a contour that includes an arc shape that extends along an arc having a center of curvature that is adjacent or coincident with the rotational center axis 44A of the guide pulley 44 of the seventh modified chain guide 730.

Figure 17:
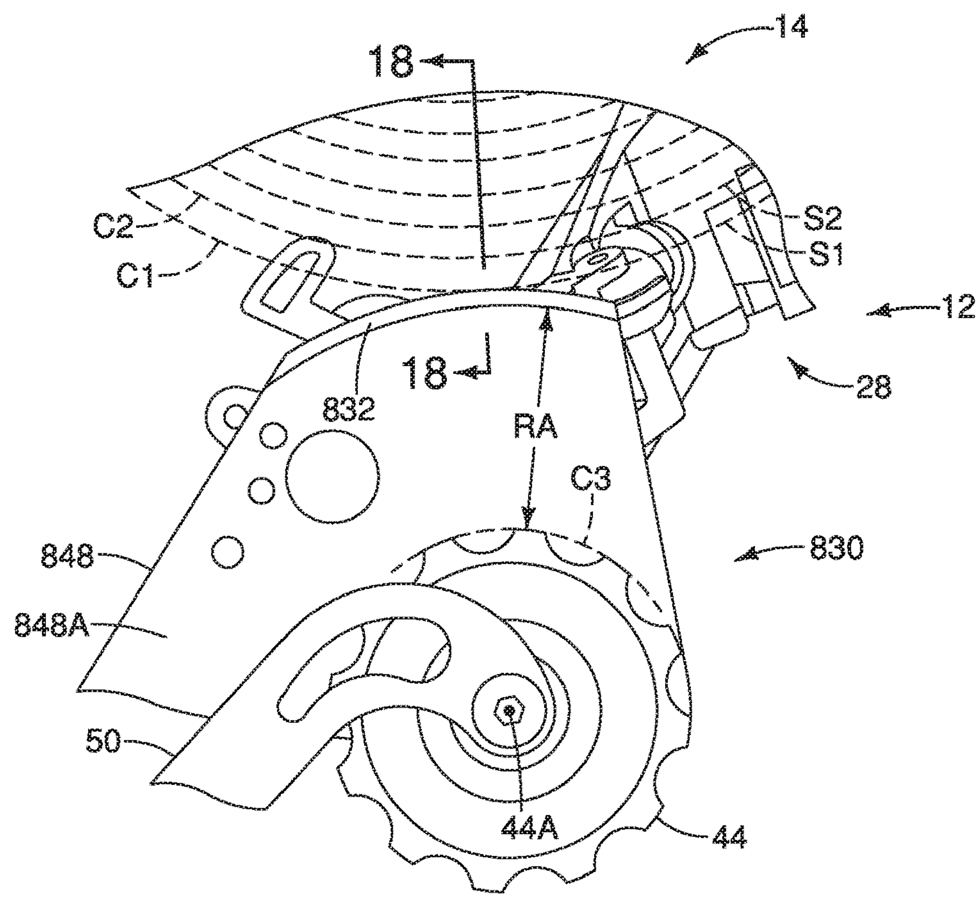
FIG. 17 is an enlarged side elevational view of a portion of an eighth modified chain guide provided with an eighth modified indicator.
Figure 18:
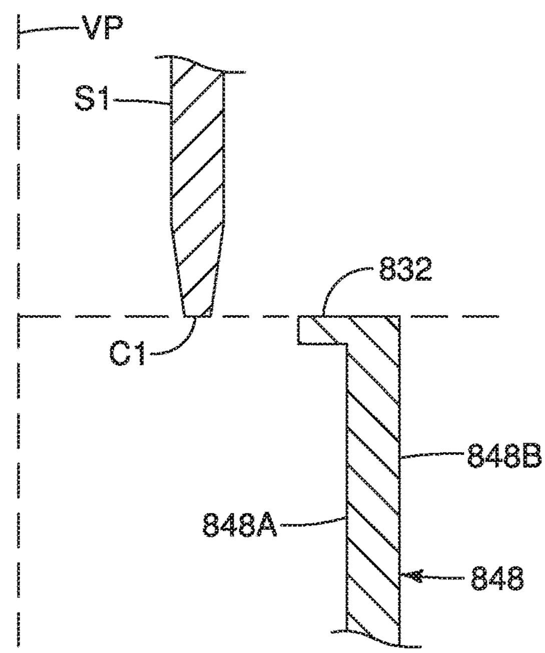
FIG. 18 is a partial cross sectional view of the eighth modified chain guide as seen along section line 18-18 of FIG. 17 with the largest sprocket also shown in partial cross section.

Referring now to FIGS. 17 and 18, an eighth modified chain guide 830 is illustrated that is being used in place of the chain guide 30 with the rear derailleur 12. The rear derailleur 12 is otherwise identical to the rear derailleur 12 of FIGS. 1 to 3 except for the chain guide 30 is replaced by the eighth modified chain guide 830 having a modified first guide plate 848. The first guide plate 848 includes a first surface 848A and a second surface 848B. The first surface 848A is disposed closer to the vertical center plane VP than the second surface 848B when the rear derailleur 12 is installed onto the bicycle frame F. The chain guide 830 is otherwise identical to the chain guide 30. The eighth modified chain guide 830 has an indicator 832 that is a bent part of the eighth modified chain guide 830. The indicator 832 of the eighth modified chain guide 830 is identical to the indicator 732 of FIGS. 15 and 16, except that the indicator 832 includes a flange. The flange is the bent part of the eighth modified chain guide 830. The indicator 832 is illustrated as extending from an outer circumference of the first guide plate 848. As shown, the bent part of the indicator 832 includes an arc shape that includes an arc having a center of curvature that is adjacent or coincident with the rotational center axis 44A of the guide pulley 44 of the eighth modified chain guide 830.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward". "front", "rear", "up", "down". "above", "below", "upward", "downward", "top", "bottom", "side". "vertical". "horizontal", "perpendicular" and "transverse" as well as any other similar directional terms refer to those directions of a bicycle in an upright, riding position and equipped with the bicycle rear derailleur. Accordingly, these directional terms, as utilized to describe the bicycle rear derailleur should be interpreted relative to a bicycle in an upright riding position on a horizontal surface and that is equipped with the bicycle rear derailleur. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rear derailleur comprising:

a chain guide including a first guide plate, a second guide plate and a guide pulley, the guide pulley being rotatably disposed between the first and second guide plates; and an indicator marked on at least one of the first and second guide plates such that the indicator is disposed on or in an outer periphery of the chain guide, when the bicycle rear derailleur is mounted to a bicycle, the indicator being indicative of a setting position of an outer circumference of a sprocket of a bicycle rear sprocket assembly relative to the guide pulley.

2. The bicycle rear derailleur according to claim 1, wherein the sprocket is a largest sprocket of the bicycle rear sprocket assembly.

3. The bicycle rear derailleur according to claim 1, wherein
the indicator includes an arc shape.

4. The bicycle rear derailleur according to claim 3, wherein
the arc shape of the indicator extends along an arc having a center of curvature adjacent or coincident with a rotational center axis of the guide pulley.

5. The bicycle rear derailleur according to claim 1, wherein
the indicator is printed indicium on the chain guide.

6. The bicycle rear derailleur according to claim 5, wherein
the printed indicium of the indicator is one of contact printed indicium and non-contact printed indicium.

7. The bicycle rear derailleur according to claim 1, wherein
the indicator includes one of a blind bore and a through bore.

8. The bicycle rear derailleur according to claim 1, wherein
the indicator includes a protuberance.

9. The bicycle rear derailleur according to claim 8, wherein
the protuberance is integrally formed with the chain guide as a unitary one-piece member.

10. The bicycle rear derailleur according to claim 8, wherein the protuberance is a separate member from the chain guide.

11. The bicycle rear derailleur according to claim 1, wherein
the indicator is a bent part of the chain guide.

12. The bicycle rear derailleur according to claim 1, wherein
the indicator is a part of a contour of the chain guide.

13. The bicycle rear derailleur according to claim 1, wherein
the indicator is engraved in the chain guide.

14. The bicycle rear derailleur according to claim 1, wherein
the indicator is spaced from an outer circumference of the guide pulley by a radial distance ranging from three millimeters to thirty millimeters with respect to a rotational center axis of the guide pulley.

15. The bicycle rear derailleur according to claim 14, wherein
the radial distance ranges from ten millimeters to thirty millimeters.

16. The bicycle rear derailleur according to claim 15, wherein
the radial distance ranges from fifteen millimeters to twenty-five millimeters.

17. The bicycle rear derailleur according to claim 1, wherein
the indicator is disposed on the first guide plate, and
the first guide plate is disposed closer to the sprocket than the second guide plate when the bicycle rear derailleur is mounted to the bicycle.

18. The bicycle rear derailleur according to claim 17, wherein
the first guide plate includes a first surface and a second surface,
the first surface faces towards a vertical center plane of the bicycle when the bicycle rear derailleur is mounted to the bicycle, and
the second surface faces in an opposite direction from the first surface, and the indicator is disposed on the first surface.

* * * * *